United States Patent
Rolinski et al.

(10) Patent No.: US 11,308,822 B2
(45) Date of Patent: Apr. 19, 2022

(54) CONSISTENT UNBIASED AUTOMATED METHOD FOR EVALUATING AND EXAMINING STUDENT PILOTS

(71) Applicants: Alex Rolinski, Eustis, FL (US);
Brandon Marsell, Merritt Island, FL (US)

(72) Inventors: Alex Rolinski, Eustis, FL (US);
Brandon Marsell, Merritt Island, FL (US)

(*) Notice: Subject to any disclaimer, the term of this patent is extended or adjusted under 35 U.S.C. 154(b) by 258 days.

(21) Appl. No.: 16/585,940

(22) Filed: Sep. 27, 2019

(65) Prior Publication Data

US 2020/0105159 A1 Apr. 2, 2020

Related U.S. Application Data

(60) Provisional application No. 62/740,273, filed on Oct. 2, 2018.

(51) Int. Cl.
*G09B 19/16* (2006.01)
*G06F 9/445* (2018.01)

(52) U.S. Cl.
CPC .......... *G09B 19/165* (2013.01); *G06F 9/445* (2013.01)

(58) Field of Classification Search
CPC ........ G09B 19/16; G09B 19/165; G09B 9/00; G09B 9/02; G09B 9/04; G09B 9/06; G09B 9/08; G09B 9/24; G06F 9/445
See application file for complete search history.

(56) References Cited

U.S. PATENT DOCUMENTS

| | | | | |
|---|---|---|---|---|
| 9,576,404 | B2* | 2/2017 | Ziarno | G07C 5/0841 |
| 10,075,228 | B2* | 9/2018 | Klippert | H04B 7/155 |
| 2002/0035416 | A1* | 3/2002 | De Leon | G07C 5/008 701/14 |
| 2005/0234689 | A1* | 10/2005 | Gates | G09B 9/44 703/8 |
| 2018/0293909 | A1* | 10/2018 | Lechner | G09B 9/44 |

* cited by examiner

*Primary Examiner* — Timothy A Musselman
(74) *Attorney, Agent, or Firm* — William Lovin & Associates LLC; William R Lovin

(57) ABSTRACT

A system and method of evaluating and examining a student pilot in an automated, consistent, unbiased way using a flight data recorder and analyzing the flight data recorded in real time.

8 Claims, 1 Drawing Sheet

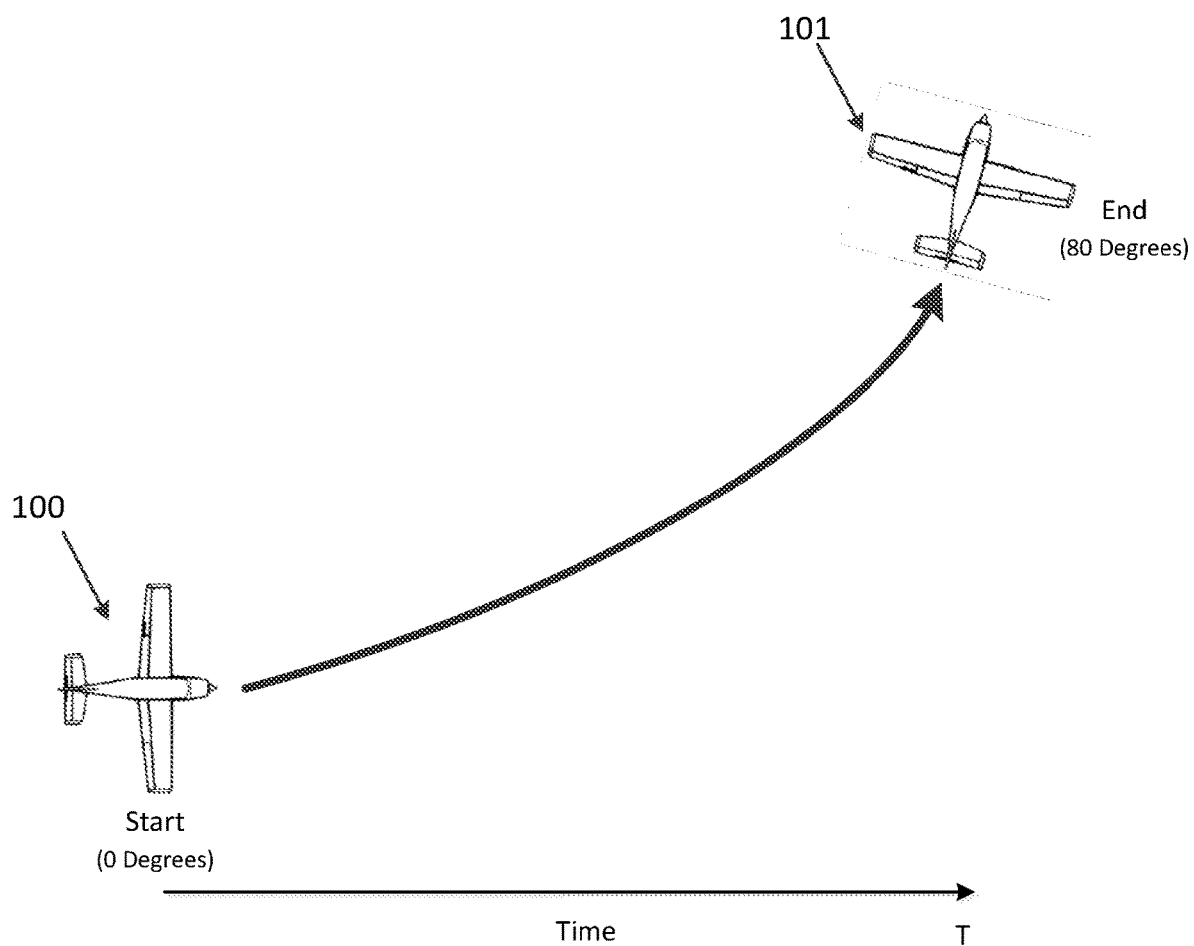

CONSISTENT UNBIASED AUTOMATED METHOD FOR EVALUATING AND EXAMINING STUDENT PILOTS

CROSS-REFERENCE TO RELATED APPLICATIONS

This application takes benefit of U.S. Prov. App. No. 62/740,273 filed Oct. 2, 2018 and incorporates it, in its entirety, by reference.

FIELD OF THE INVENTION

The present invention relates to a system and method of evaluating and examining a student pilot in an automated, consistent, unbiased way.

BACKGROUND OF THE INVENTION

Student pilots are trained and examined by human instructor pilots. The personal relationship that the student pilot has with his instructor is thus central to the instruction and testing process. It has been shown that a student pilot's personal relationship with the instructor can affect the final score of the evaluation.

In the U.S., each maneuver to be learned is tested based on an FAA articulated standard. For example, a "steep turns" maneuver might be assigned parameters governing a differential altitude, a differential airspeed, a differential bank angle, and a differential entry heading. During tested execution of the maneuver, each parameter is recorded at the beginning of the maneuver and at the end of the maneuver. The student is graded using an algorithm that measures the entry parameters and their delta from the exit parameters. A flight test is a sequence of these events.

SUMMARY OF THE INVENTION

An exemplary embodiment of the invention comprises a flight data recording device such as a Garmin G-1000, a Wingbug®, or any other instrumentation system capable of recording flight data affixed to an aircraft used to administer the test. Next, the pilot and the instructor take the aircraft up. Once in the air, the instructor calls out a maneuver for the student pilot to attempt. At this point, the student attempts to execute the maneuver the instructor selected. During the maneuver, the flight data recording device records various parameters such as the altitude, the airspeed, the bank angle, and the entry heading associated with the maneuver at the beginning of the maneuver, throughout the maneuver, and at the end of the maneuver. Once the maneuver is completed, a software program uses the recorded parameters and objectively compares them to a pre-defined standard (FAA or any other standard). Finally, the software program assigns a grade based on the differential it calculated during the previous step.

DRAWINGS

FIG. 1 shows an example of a steep 90° left turn with a differential in heading and no differentials in altitude, airspeed, or initial and terminal bank.

DETAILED DESCRIPTION OF THE PREFERRED EMBODIMENT

Referring now to FIG. 1, a steep 90° left turn with a differential in heading and no differentials in altitude, airspeed, or initial and terminal bank is illustrated as an example of the system and method. At 100 and at time zero, the student and the instructor begin the maneuver. The tested protocol for a steep 90° turn to the left is that the turn is initiated and at some time T later the turn is completed. The flight data recording system installed in or on the aircraft notes the direction of flight is 0° at the initiation of the maneuver. At 101 and time T the maneuver is concluded. Next, the flight data recording system installed in or on the aircraft notes the direction of flight at 80°. Next, the computer calculates the difference between the attitude (direction) of the aircraft at the beginning of the maneuver and the attitude (direction) of the aircraft at the end of the maneuver (0°−80°=−80°). Next, the computer takes the absolute value of the calculated value. Next, the computer consults the FAA assigned value for demonstrating the ability to make a steep, 90° planar turn to the left. Assuming the value is 90°, the recorded absolute value of 80° presents a 10° differential. The score for the maneuver is calculated based on the differential.

The maneuver may be simple as above, or it may be complex with multiple monitored parameters in multiple axes. For example, a steep 90° planar turn with differentials allowed in altitude of ±100 feet, airspeed of ±10 knots, bank of ±5°, and roll out from the entry heading of ±10°.

Each category (altitude, airspeed, bank angle, and heading angle) will have an associated error amount and an error threshold. In one embodiment, a perfect maneuver would result in 0 error score. The most extreme passing flight would result in a 100.

Each category accounts for 1/# categories of the maximum error. The percentage of error in that category is multiplied by that category's maximum error amount and added to the overall total error. For example, a student completing this maneuver that had differentials of +10 feet, −5 knots, +1° bank angle, and +5° heading angle would have a score of:

$$\text{score} = ((+10 \text{ feet}/+-100 \text{ feet}) \times 25) + ((-5 \text{ knots}/+-10 \text{ knots}) \times 25) + ((+1° \text{ bank angle}/+-5° \text{ bank angle}) \times 25) + ((+5° \text{ heading angle}/+-10° \text{ heading angle}) \times 25) \quad [\text{eq. 1}]$$

Or:

$$\text{score} = 2.5 + 12.5 + 5.0 + 12.5 = 32.5 \quad [\text{eq. 2}]$$

Categories may be weighted as necessary. Error amounts can be shifted as necessary (i.e. the error associated with a differential between +70 and +80 feet being weighted as greater than the error associated with a differential ranging from +0 to +10 feet).

The data is collected and graded in real time against a previously articulated FAA scoring criteria. Of course, the instructor would start and stop the grading at the beginning and end of each maneuver. The score would be captured and stored for later review.

Minimum overall passing score criteria (e.g. 80% overall with no single maneuver less than 70%) may be established within FAA guidelines.

Other embodiments of the invention are included by reference. For example, it would be obvious that measurements can be taken at all points in time during the maneuver. The data is again collected and graded in real time against a previously articulated FAA scoring criteria. In this case, the instructor would start and stop the data collection at the beginning and end of each maneuver. The processor itself would analyze the data at various points in time as the maneuver was completed and grade against a previously articulated FAA scoring criteria.

It will be obvious to one having skill in the art that an automated version of the present invention may be constructed that does not require an instructor. For example, a flight manifest, or route, may be constructed beforehand. The manifest, or route, contains an arbitrary number of turns, elevations, speeds, and elapsed times. This route is provided to the pilot and to the present invention. As the pilot travels along the manifest, or route, the present invention collects information regarding: 1) The angle and speed of turns; 2) The horizontal location, angle of climb of dive, and beginning and ending elevation; 3) The speed; and, 4) The time at which the maneuver was performed or the location was reached. The present invention compares this collected information with the manifest, or route, provided before the flight was conducted. The differentials associated with each element of the flight are then calculated and summed into a score. The score would then be available for use by the pilot's superiors for analysis and use in flight performance grading and analysis.

The invention claimed is:

1. A consistent unbiased automated method for evaluating and examining a student pilot comprising:
   a. a flight data recording device affixed to an aircraft collecting flight data;
   b. a software program running on a computer processor accessing the flight data recorded by the flight data recording device;
   c. wherein the software program running on the computer processor calculates the difference between proposed flight data provided prior to the beginning of a maneuver and actual flight data recorded while the maneuver was conducted and calculates a score based on the difference between the proposed data and the actual data.

2. A consistent unbiased automated method for evaluating and examining a student pilot of claim 1 wherein the computer processor is located inside the flight data recording device.

3. A consistent unbiased automated method for evaluating and examining a student pilot of claim 1 wherein the computer processor is located outside the flight data recording device.

4. A consistent unbiased automated method for evaluating and examining a student pilot of claim 1 wherein the software program running on the computer processor determines whether the student pilot has passed or failed the maneuver based on the calculated score.

5. A consistent unbiased automated method for evaluating and examining a student pilot of claim 1 wherein the proposed flight data describes one maneuver.

6. A consistent unbiased automated method for evaluating and examining a student pilot of claim 1 wherein the proposed flight data describes more than one maneuver.

7. A consistent unbiased automated method for evaluating and examining a student pilot of claim 1 wherein the flight data recording device is a Garmin G-1000.

8. A consistent unbiased automated method for evaluating and examining a student pilot of claim 1 wherein the flight data recording device is a Wingbug.

* * * * *